(12) United States Patent
Wu et al.

(10) Patent No.: US 10,962,843 B2
(45) Date of Patent: Mar. 30, 2021

(54) DISPLAY PANEL AND DISPLAY DEVICE

(71) Applicant: Xiamen Tianma Micro-Electronics Co., Ltd., Xiamen (CN)

(72) Inventors: Ling Wu, Xiamen (CN); Boping Shen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/552,214

(22) Filed: Aug. 27, 2019

(65) Prior Publication Data
US 2020/0103690 A1    Apr. 2, 2020

(30) Foreign Application Priority Data
Sep. 30, 2018 (CN) .......................... 201811153610.X

(51) Int. Cl.
  *G02F 1/1339* (2006.01)
  *G02F 1/1362* (2006.01)
(52) U.S. Cl.
  CPC .... *G02F 1/13394* (2013.01); *G02F 1/136209* (2013.01)

(58) Field of Classification Search
CPC .................................................. G02F 1/13394
See application file for complete search history.

(56) References Cited

U.S. PATENT DOCUMENTS

2018/0173034 A1* 6/2018 Yonemura ............. G02F 1/1343

FOREIGN PATENT DOCUMENTS

| CN | 2720476 Y | 8/2005 |
| CN | 104516158 A | 4/2015 |
| CN | 207264062 U | 4/2018 |

* cited by examiner

*Primary Examiner* — Edmond C Lau
(74) *Attorney, Agent, or Firm* — Anova Law Group PLLC

(57) ABSTRACT

A display panel and a display device are provided. The display panel includes a first substrate and a second substrate, that are oppositely disposed. The display panel also includes a display material layer and support pillars, that are disposed between the first substrate and the second substrate. Further, the display panel includes a first region, a second region disposed surrounding the first region, and a third region disposed surrounding the second region. The first region does not contain any support pillar. The support pillars are disposed in the second and third regions, and have an area density in the second region larger than an area density in the third region.

20 Claims, 8 Drawing Sheets

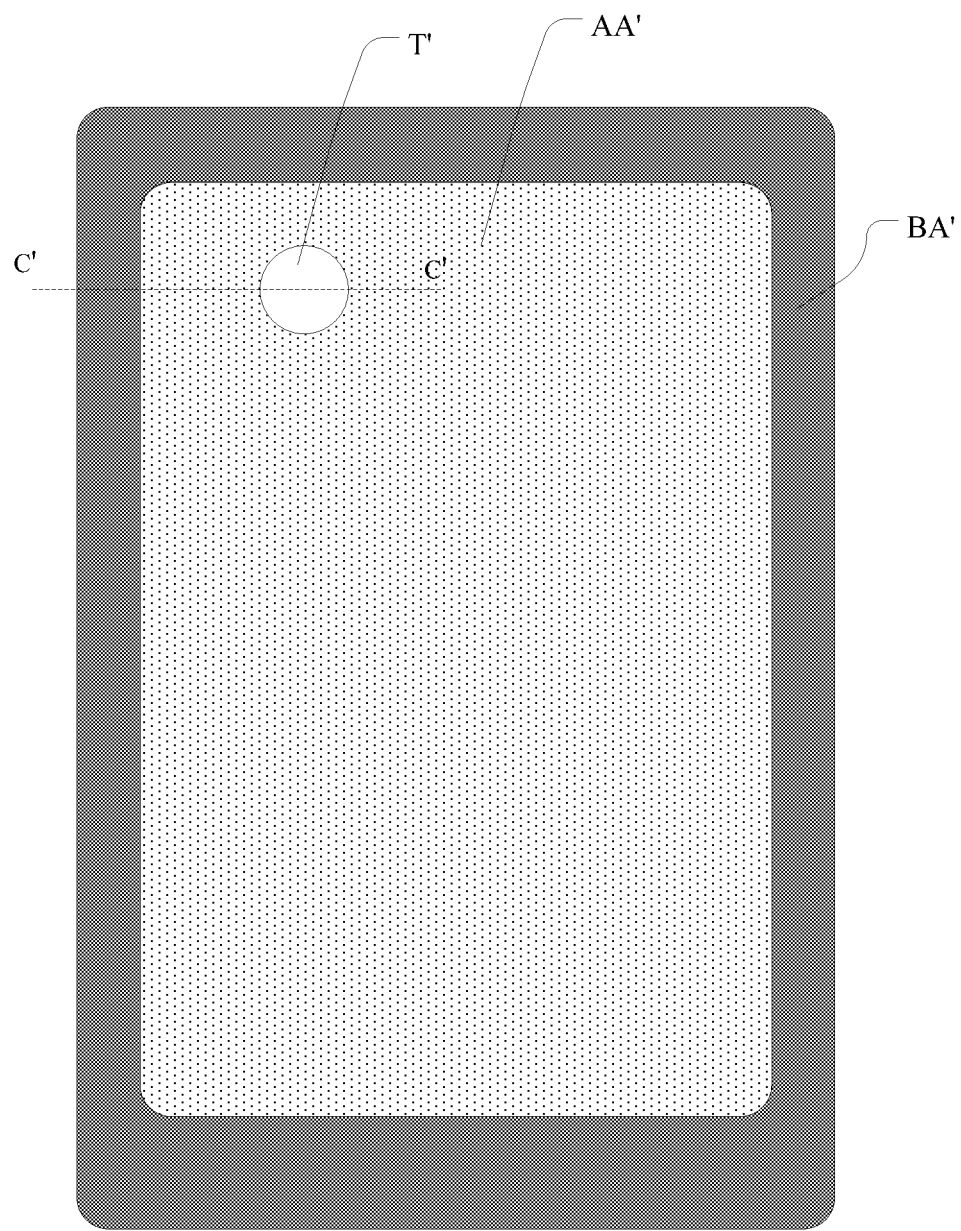
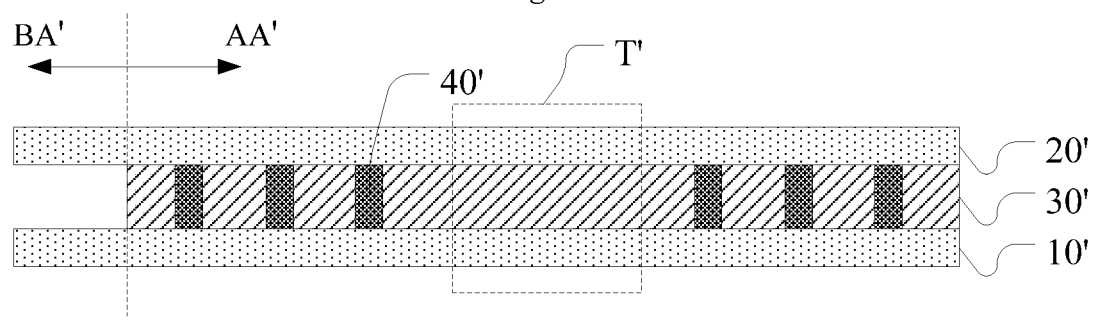
Figure 1
Figure 2

DISPLAY PANEL AND DISPLAY DEVICE

CROSS-REFERENCES TO RELATED APPLICATIONS

This application claims the priority of Chinese patent application No. 201811153610.X, filed on Sep. 30, 2018, the entirety of which is incorporated herein by reference.

FIELD

The present disclosure generally relates to the field of display technology and, more particularly, relates to a display panel and a display device.

BACKGROUND

Nowadays, a display panel with a narrow frame width is highly demanded. For a fixed overall size, display panels with a narrow-frame or even a frameless display will enable the display region to provide a broad view to the greatest extent. To increase a screen ratio of the display panel, a conventional display panel includes a following structure. A region not used for display is designed in the display region, and functional units, e.g., a camera, etc., are provided at a location corresponding to the region not used for display. The reduction of frame is achieved by disposing the functional units supposedly located in the frame region in the region not used for display.

Although the frame width of the display panel having the above-described structure is reduced, a structural change of the display region often causes new issues and reduces the display effect of the display panel. Therefore, how to improve the display effect of the display panel has become an urgent technical problem to be solved. The disclosed display panel and display device are directed to solve one or more problems set forth above and other problems.

SUMMARY

One aspect of the present disclosure provides a display panel. The display panel includes a first substrate and a second substrate, that are oppositely disposed. The display panel also includes a display material layer and support pillars, that are disposed between the first substrate and the second substrate. Further, the display panel includes a first region, a second region disposed surrounding the first region, and a third region disposed surrounding the second region. The first region does not contain any support pillar. The support pillars are disposed in the second and third regions, and have an area density in the second region larger than an area density in the third region.

Another aspect of the present disclosure provides a display device. The display device includes a display panel. The display panel includes a first substrate and a second substrate, that are oppositely disposed. The display panel also includes a display material layer and support pillars, that are disposed between the first substrate and the second substrate. Further, the display panel includes a first region, a second region disposed surrounding the first region, and a third region disposed surrounding the second region. The first region does not contain any support pillar. The support pillars are disposed in the second and third regions, and have an area density in the second region larger than an area density in the third region.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

FIG. 1 illustrates a schematic top-view of a display panel;

FIG. 2 illustrates a schematic diagram of film layers of a display panel;

DETAILED DESCRIPTION OF THE INVENTION

Figure 3:
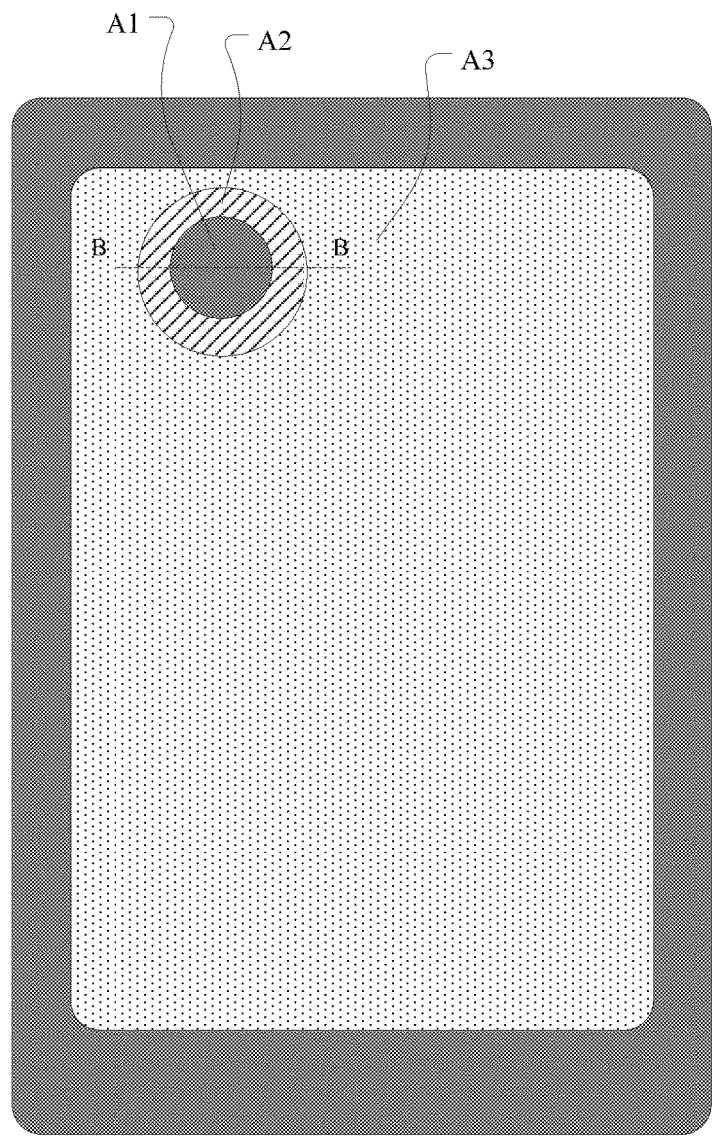
FIG. 3 illustrates a schematic top-view of an exemplary display panel consistent with disclosed embodiments of the present disclosure.

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

In a conventional display device, a camera is disposed in a display region. The display panel provides a high light transmission region in a location corresponding to the camera, such that the camera disposed behind the display panel can work through the display panel. For such display device, when the region where the camera is located is pressed during operation, a water ripple phenomenon occurs in the display region near the camera. Further, for the display panel applied to such display device, in a panel withstand pressure test, there is often a risk of insufficient panel pressure of the high light transmission region.

FIG. 1 illustrates a schematic top-view of a display panel, and FIG. 2 illustrates a schematic diagram of film layers of the display panel, where FIG. 2 illustrates a schematic C'-C' sectional view of the display panel in FIG. 1. Referring to FIG. 1, the display panel includes a display region AA' and a non-display region BA' disposed surrounding the display region AA'. A high light transmission region T' is disposed in the display region AA', and a camera is disposed in a location corresponding to the high light transmission region in the display device.

Referring to FIG. 2, the display panel includes two substrates 10' and 20' that are oppositely disposed, and a display material layer 30' disposed between the two substrates. Support pillars 40' are often disposed between the two substrates at a location corresponding to the non-opening region to support the two substrates. Therefore, the withstand pressure ability of the display panel is improved, and the opening region is not blocked, such that the aperture ratio of the display panel is not affected. To ensure the high light transmission property of the high light transmission region T', the high light transmission region T' does not contain any support pillar 40'. Therefore, the high light transmission region T' may have insufficient panel pressure issue and poor display issues, e.g., water ripple, etc.

The present disclosure provides a display panel and a display device. For a display panel in which a partial region of a display region does not contain any support pillar, an area density of support pillars in regions other than the partial region of the display panel may be adjusted to improve the overall withstand pressure ability of the display panel. Further, the poor display issues of the display panel, e.g., the occurrence of water ripple in the vicinity of the region containing no support pillars, may be reduced, and the display effect of the narrow-frame display panel may be improved.

Figure 4:
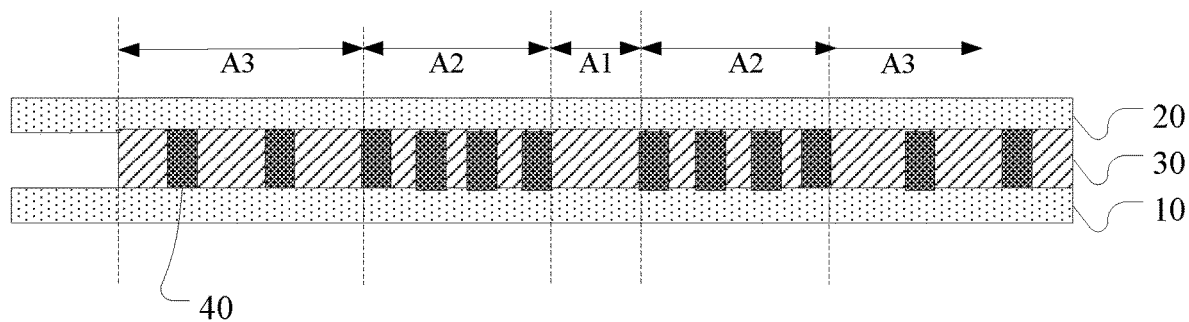
FIG. 4 illustrates a schematic diagram of film layers of another exemplary display panel consistent with disclosed embodiments of the present disclosure.

FIG. 3 illustrates a schematic top-view of a display panel consistent with disclosed embodiments of the present disclosure, and FIG. 4 illustrates a schematic diagram of film layers of the disclosed display panel, where FIG. 4 illustrates a schematic B-B sectional view of the display panel in FIG. 3. In one embodiment, referring to FIG. 3, the display panel may include a first region A1, a second region A2 disposed surrounding the first region A1, and a third region A3 disposed surrounding the second region A2. Referring to FIG. 4, the display panel may include a first substrate 10 and a second substrate 20 that are oppositely disposed. Further, the display panel may include a display material layer 30 and support pillars 40, that are disposed between the first substrate 10 and the second substrate 20.

The first region A1 may not contain any support pillar 40 and any display pixel. In one embodiment, the first region A1 may be a high light transmission region, and units of the display device, e.g., a camera, etc., may be disposed in a location corresponding to the high light transmission region. In another embodiment, the first region A1 may be any other suitable functional region. The first region A1 may not contain any support pillar 40 based on the function demands thereof. The second region A2 may be a region disposed surrounding the first region A1. The size of the second region A2 may be determined according to practical applications. In one embodiment, display pixels may be disposed in the second region A2. In another embodiment, the display pixels may not be disposed in the second region A2. In certain embodiments, the display pixels may be disposed in a partial region of the second region A2. The third region A3 may be a region disposed surrounding the second region A2, and the third region A3 may be fully provided with display pixels.

The support pillars 40 may be disposed in the second region A2 and the third region A3, and may have an area density in the second region A2 larger than an area density in the third region A3. The area density of the support pillars 40 may refer to an area occupied by the support pillars 40 per unit area. In one embodiment, the area density of the support pillars in the second region A2 may be defined as a ratio of the area occupied by the support pillars 40 in the second region A2 over the overall area of the second region A2. The area density of the support pillars in the third region A3 may be defined as a ratio of the area occupied by the support pillars in the third region A3 over the overall area of the third region A3.

In one embodiment, the support pillar 40 may be formed on the first substrate 10. In another embodiment, the support pillar 40 may be formed on the second substrate 20. When the support pillar 40 is formed on the first substrate 10, the area occupied by the support pillar 40 is a contact area between the support pillar 40 and the first substrate 10. When the support pillar 40 is formed on the second substrate 20, the area occupied by the support pillar 40 may be a contact area between the support pillar 40 and the second substrate 20.

In one embodiment, a cross-section at any position along a height of the support pillar 40 may be substantially the same in shape and in size. In another embodiment, the substrate for forming the support pillar 40 may refer to a base substrate. An end surface of the support pillar 40 in contact with the base substrate may have a same shape as an end surface thereof away from the base substrate. However, the end surface of the support pillar 40 in contact with the base substrate may have a larger area compared to the end surface of the support pillar 40 away from the base substrate, which may facilitate the formation of the support pillar 40.

At the same time, the difference in area density of the support pillars 40 may be achieved by one or more of the difference in the size of the area occupied by single support pillar 40 and the difference in the quantity of support pillars 40 per unit area. In one embodiment, an orthographic projection of the support pillar 40 on the first substrate 10 may have a shape of a circular shape, an elliptical shape, a quadrangular shape, an elongated shape, or a combination thereof. To enable the support pillars to have an area density in the second region A2 larger than an area density in the third region A3, the difference in area density of the support pillars 40 may be achieved by any other suitable manner, which is not limited by the present disclosure.

In the disclosed display panel, the display panel may include the first region containing no support pillars, such that the first region may act as a special functional region, e.g., a high light transmission region. Compared to the conventional display panel, for the regions containing the support pillars, the area density of the support pillars may not be uniform. The support pillars may have an area density in the region disposed around the first region, i.e., the second region disposed surrounding the first region, larger than an area density in the region outside of the second region, i.e., the third region disposed surrounding the second region. Therefore, the insufficient panel pressure in the region around the first region due to the absence of the support pillars in the first region, and easy occurrence of water ripple issue may be resolved, and the display effect of the display panel may be improved.

Figure 5:
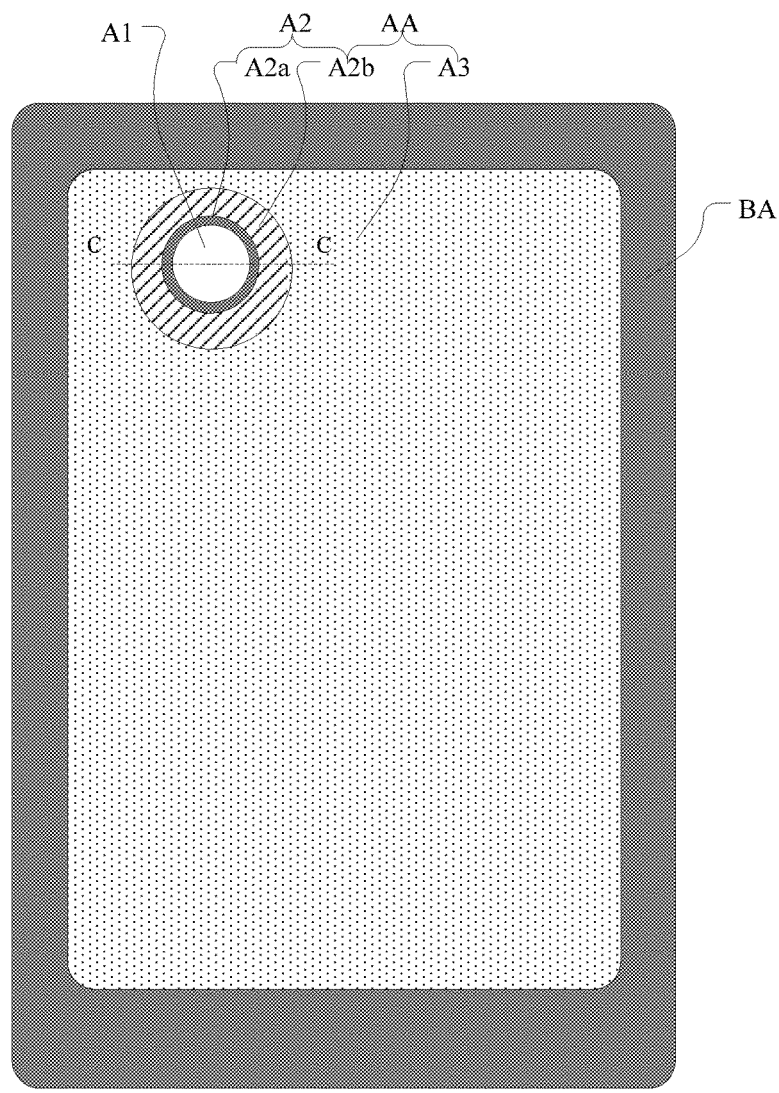
FIG. 5 illustrates a schematic top-view of another exemplary display panel consistent with disclosed embodiments of the present disclosure.
Figure 6:
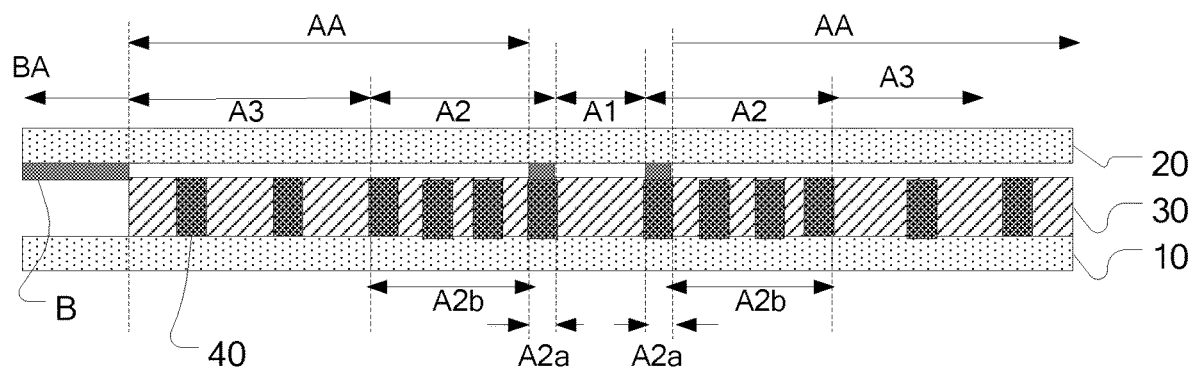
FIG. 6 illustrates a schematic diagram of film layers of another exemplary display panel consistent with disclosed embodiments of the present disclosure.

FIG. 5 illustrates a schematic top-view of a display panel consistent with disclosed embodiments of the present disclosure, and FIG. 6 illustrates a schematic diagram of film layers of the disclosed display panel, where FIG. 6 illustrates a schematic C-C sectional view of the display panel in FIG. 5. In one embodiment, referring to FIG. 5 and FIG. 6, the first region A1 may be a high light transmission region, and the second region A2 may include a frame region A2a of the high light transmission region and a first display region A2b. The first display region A2b and the third region A3 together may form a display region AA of the display panel. The non-display region BA may surround the display region AA. A black matrix B may be disposed in each of the non-display region BA and the frame region A2a for blocking light.

Figure 7:
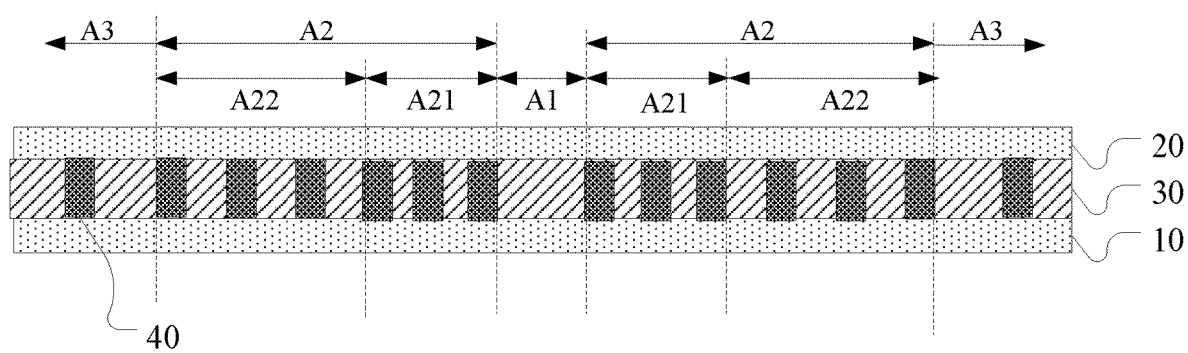
FIG. 7 illustrates a schematic diagram of film layers of another exemplary display panel consistent with disclosed embodiments of the present disclosure.

FIG. 7 illustrates a schematic diagram of film layers of another display panel consistent with disclosed embodiments of the present disclosure. In one embodiment, referring to FIG. 7, the second region A2 may include a first sub-region A21 and a second sub-region A22. The first sub-region A21 may be disposed adjacent to the first region A1, and the second sub-region A22 may be disposed between the first sub-region A21 and the third region A3. The support pillars 40 may have an area density in the first sub-region A21 larger than an area density in the second sub-region A22.

In the disclosed display panel, the support pillars may have an area density in the second region larger than an area density in the third region. Further, in the second region, the support pillars may have an area density in a location close to the first region larger than an area density in a location close to the third region. Therefore, in the second region, the closer to the first region containing no support pillars, the larger the withstand pressure ability compensated by the support pillars. Thus, the compensation effect on the first region may be desired, and at the same time, the area density of the support pillars in the second region may be prevented from being excessively large to affect the aperture ratio of the display panel.

In one embodiment, referring to one of FIG. 4 and FIG. 7, in a unit area, the quantity of support pillars 40 in the second region A2 may be larger than the quantity of support pillars 40 in the third region A3. In the disclosed display panel, the support pillars having an area density in the second region larger than an area density in the third region may be achieved through the difference in the quantity of support pillars per unit area.

Further, in another embodiment, referring to one of FIG. 4 and FIG. 7, the support pillars 40 in the second region A2 and the third region A3 may have the same shape and the same size.

In the disclosed display panel, when disposing the support pillars in the display panel, the support pillars may have the same size and the same shape. The large area density of the support pillars in the second region may be implemented by disposing a substantially large quantity of support pillars in the second region. When forming a support pillar by etching, because the support pillars have the same size and shape, the process difficulty of fabricating the mask used for etching the support pillar may be simplified.

Figure 8:
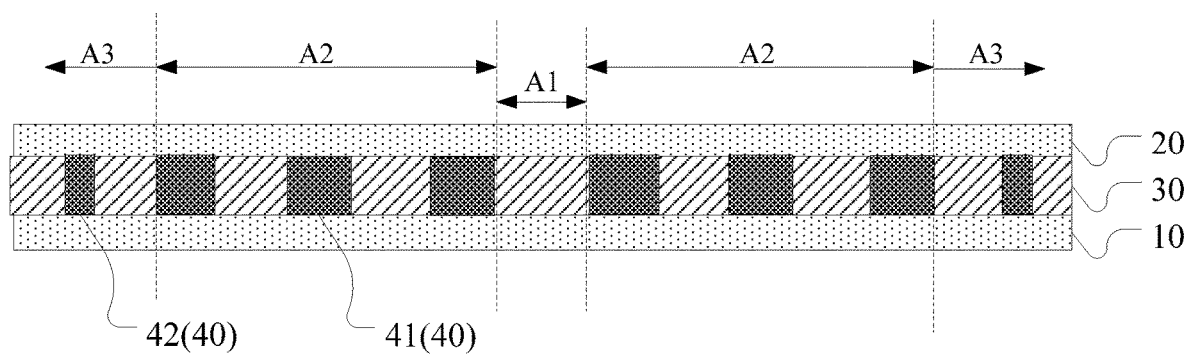
FIG. 8 illustrates a schematic diagram of film layers of another exemplary display panel consistent with disclosed embodiments of the present disclosure.

FIG. 8 illustrates a schematic diagram of film layers of another display panel consistent with disclosed embodiments of the present disclosure. In one embodiment, referring to FIG. 8, the support pillars 40 may include a plurality of first support pillars 41 and a plurality of second support pillars 42. An area of an orthographic projection of a first support pillar of the plurality of first support pillars 41 on the first substrate 10 may be larger than an area of an orthographic projection of a second support pillar of the plurality of second support pillars 42 on the first substrate 10. Further, the second region A2 may include the first support pillars 41, and the third region A3 may include the second support pillars 42. The second support pillars 42 may also be disposed in the second region A2.

In the disclosed display panel, support pillars having different sizes may be disposed. The support pillar having a larger size may be disposed in the second region, and the support pillar having a smaller size may be disposed in the third region. The support pillars having an area density in the second region larger than an area density in the third region may be achieved through the difference in the size of the support pillar. In one embodiment, referring to FIG. 8, in a unit area, the quantity of support pillars 40 in the second region A2 may be equal to the quantity of support pillars 40 in the third region A3.

In the disclosed display panel, when disposing the support pillars in the display panel, the density of the support pillars may be uniform. In other words, in a unit area, the quantity of support pillars in the second region may equal to the quantity of support pillars in the third region. The substantially large area density of the support pillars in the second region may be implemented by disposing support pillars having a substantially large size in the second region. When forming the support pillar by etching, because the density of the support pillars in the second region equals to the density of the support pillars in the third region, the process difficulty of fabricating the mask used for etching the support pillar may be simplified.

The substantially large area density of the support pillars in the second region may be achieved by one or more of large size of the area occupied by a single support pillar and the large density of the support pillars per unit area. In one embodiment, referring to FIG. 3 and FIG. 4, the area density of the support pillars 40 in the second region A2 may be obtained by a calculation according to the area of the first region A1, the area of the second region A2, and the area density of the support pillars 40 in the third region A3.

In the disclosed display panel, the area density of the support pillars in the second region may be determined according to the area of the first region, the area of the second region, and the area density of the support pillars in the third region, such that the area density of the support pillars at every location on the display panel may be substantially uniform.

In one embodiment, referring to FIG. 3 and FIG. 4, the area density of the support pillars 40 in the second region A2 may be calculated using the following formula: $d_B=(S_B+S_C)*d_A/S_B$, where $d_B$ is the area density of the support pillars in the second region A2, $d_A$ is the area density of the support pillars in the third region A3, $S_B$ is the area of the second region A2, and $S_C$ is the area of the first region A1.

In the disclosed display panel, the area density of the support pillars in the second region may be determined according to the above formula. Therefore, the overall area density of the support pillars in the first region and in the second region may be consistent with the area density of the support pillars in the third region. In other words, the overall area density of the display panel may be uniform, such that the display panel may have the same withstand pressure ability at any location, and the uniformity of the display panel may be improved.

Figure 9:
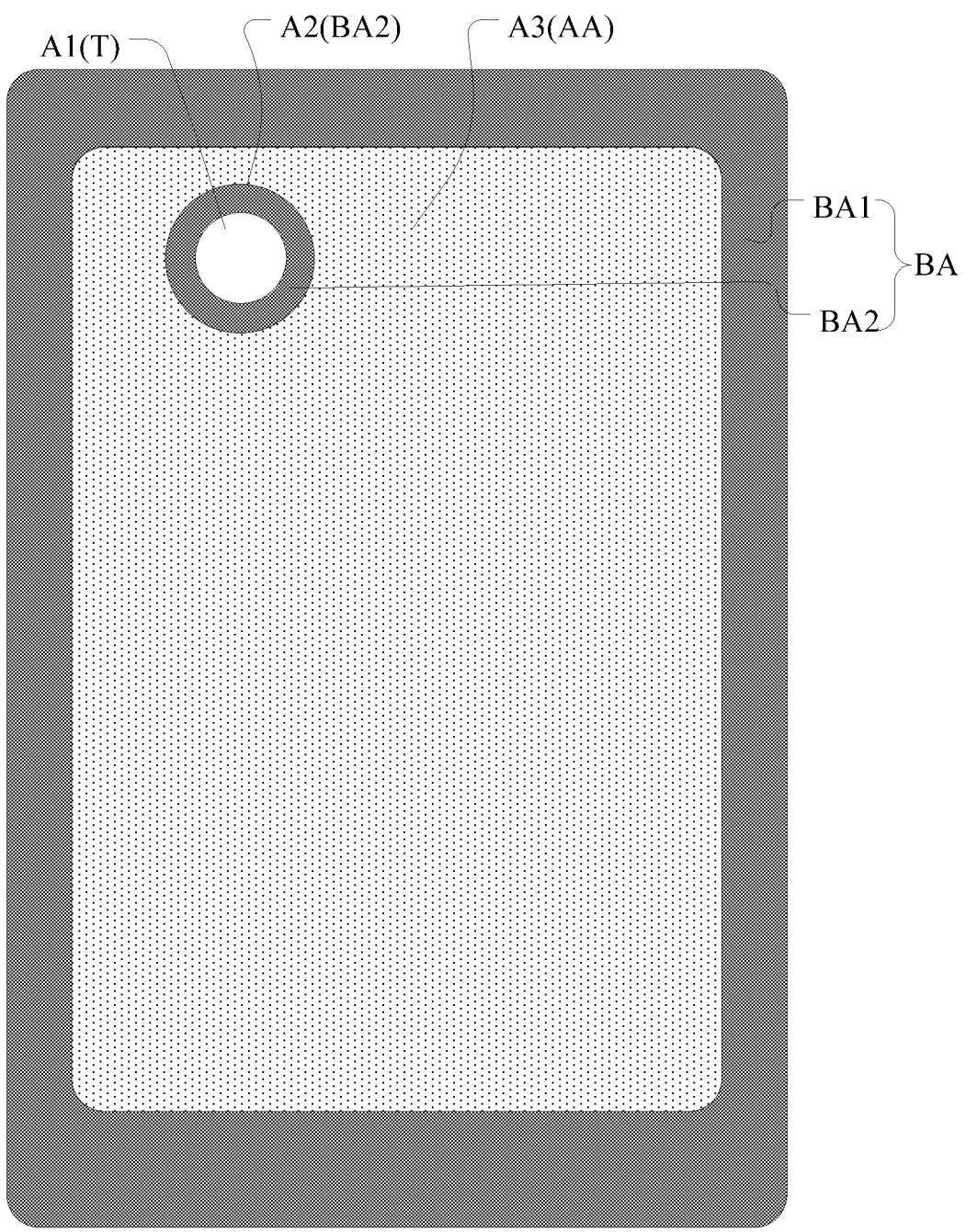
FIG. 9 illustrates a schematic top-view of another exemplary display panel consistent with disclosed embodiments of the present disclosure.

FIG. 9 illustrates a schematic top-view of another display panel consistent with disclosed embodiments of the present disclosure. In one embodiment, referring to FIG. 9, the display panel may include a display region AA having display pixels, a frame region BA covered by a black matrix, and the high light transmission region T containing no display pixels and no black matrix. The first region A1 may be the high light transmission region T. The frame region BA may include a first frame region BA1 disposed close to an outer edge of the display panel and a second frame region BA2 disposed surrounding the high light transmission region T. The second region A2 may include the second frame region BA2. Further, in one embodiment, referring to FIG. 9, the second region A2 may be the second frame region BA2, and the third region A3 may be the display region AA.

The frame region may often be covered with the black matrix and may be a non-light transmission region. In the disclosed display panel, the area density of the support pillars in the second frame region disposed surrounding the high light transmission region may be substantially large. On the one hand, the large area density of the support pillars in the second frame region may compensate for the withstand pressure ability of the high light transmission region without disposing the support pillars. On the other hand, because the second frame region is the non-light transmission region, no matter how the support pillars are disposed, the display performance may not be affected. Therefore, the arrangement manner of the support pillars in the disclosed embodiments may not affect the display region, and may not affect the aperture ratio of the display region.

Figure 10:
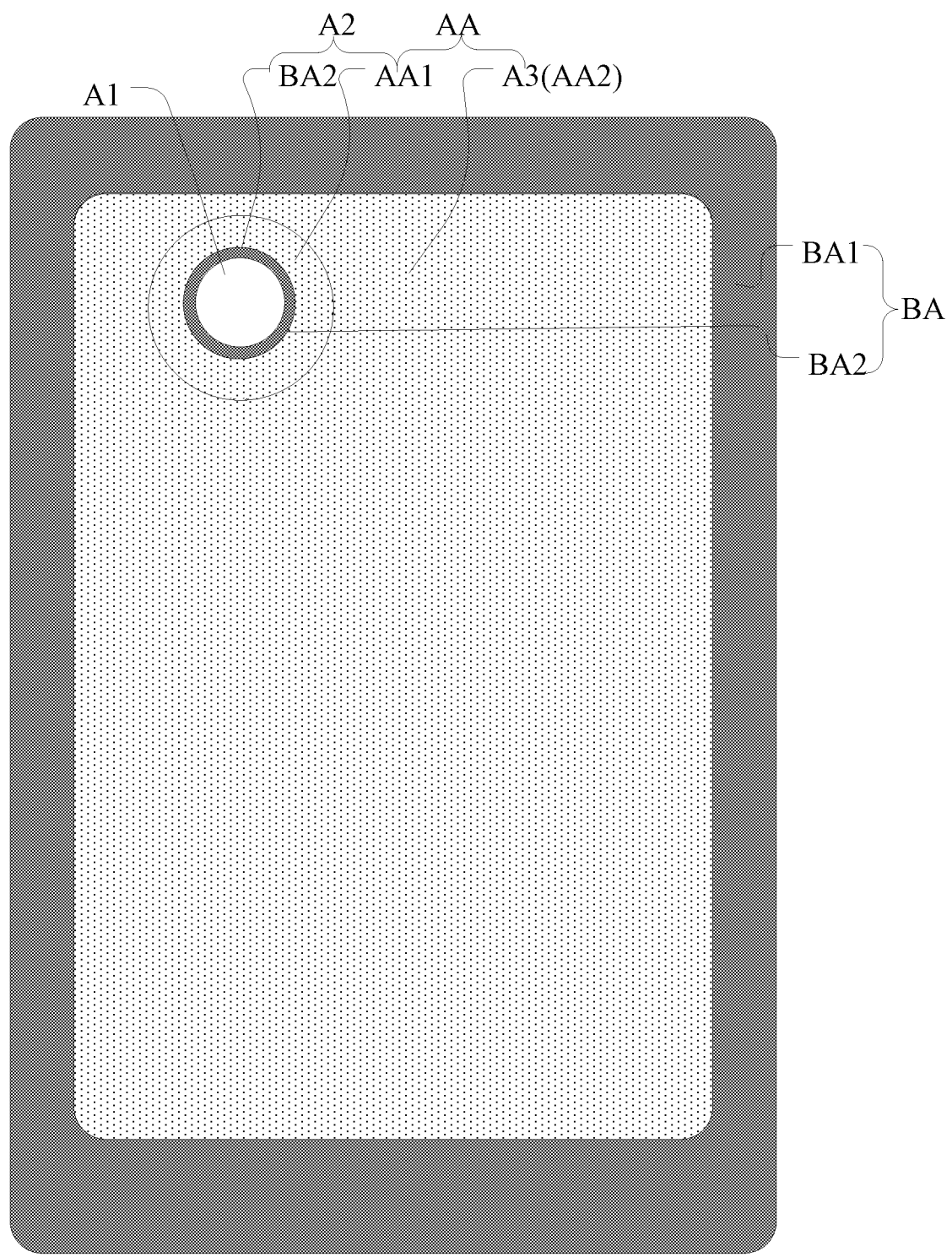
FIG. 10 illustrates a schematic top-view of another exemplary display panel consistent with disclosed embodiments of the present disclosure.

FIG. 10 illustrates a schematic top-view of another display panel consistent with disclosed embodiments of the present disclosure. In one embodiment, the second frame region may be a part of the second region. Referring to FIG. 10, the display region AA may include a first display region AA1 disposed close to the second frame region BA2 and a second display region AA2 disposed between the first display region AA1 and the first frame region BA1. The third region A3 may be the second display region AA2, and the second region A2 may include the second frame region BA2 and the first display region AA1. A sum of the area of the first region A1 and the area of the second region A2 may be larger than or equal to a predetermined area threshold.

In the disclosed display panel, the area density of the support pillars in the second frame region disposed surrounding the high light transmission region may be substantially large, and the area density of the support pillars in part of the display region disposed close to the second frame region, i.e., the first display region, may be substantially large. Therefore, the withstand pressure ability of the first region may be compensated to a large extent. In one embodiment, the support pillars may have an area density in the second frame region larger than an area density in the first display region. On the basis of ensuring sufficient compensation for the withstand pressure ability of the first region, the influence of the support pillars on the aperture ratio of the first display region may be reduced.

In one embodiment, the predetermined area threshold may be 100 mm$^2$. The predetermined area threshold may nearly equal to a contact area between a finger and the display panel when the finger presses the display panel. The overall area of the second region A2 may be greater than or equal to the contact area.

In the disclosed display panel, the area density of the support pillars in the second region, i.e., a region disposed near the first region, may be substantially large, which may compensate for the withstand pressure ability of the high light transmission region without disposing the support pillars. Further, under the premise of determining the size of the first region, the size of the second region may be determined according to the contact area between the finger and the display panel. When the finger presses a region near the first region A1, the area density of the support pillars in the pressed region may be consistent with the area density of the support pillars in any other region of the display region, i.e., the second display region AA2. Thus, during operation of the display device, the probability of the occurrence of water ripple when pressing the display panel may be reduced, and the second region with a suitable size may be selected, which may avoid disposing too many support pillars and causing unnecessary reduction of the aperture ratio of the display region.

In one embodiment, referring to FIG. 10, the first region A1 may have a circular shape, and, thus, a camera may be disposed at a location corresponding to the first region A1. At the same time, the first region A1 having the circular shape may be used to display time, or to display battery percentage, etc. In another embodiment, the first region A1 may have an oval shape, or any other suitable regular or irregular shape.

Figure 11:
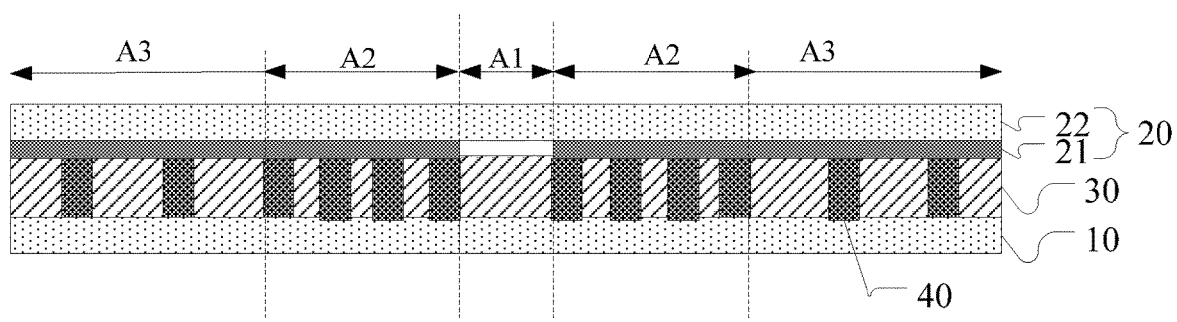
FIG. 11 illustrates a schematic diagram of film layers of another exemplary display panel consistent with disclosed embodiments of the present disclosure.

FIG. 11 illustrates a schematic diagram of film layers of another display panel consistent with disclosed embodiments of the present disclosure. In one embodiment, referring to FIG. 11, the display material layer 30 may include a liquid crystal material, and the second substrate 20 may be a color film substrate. The second substrate 20 may include a base substrate 22 and a color resist layer 21. The color resist layer 21 may include red, green and blue resist and a black matrix. The color resist layer 21 may not be disposed in the first region A1, such that the first region A1 may be the high light transmission region.

Figure 12:
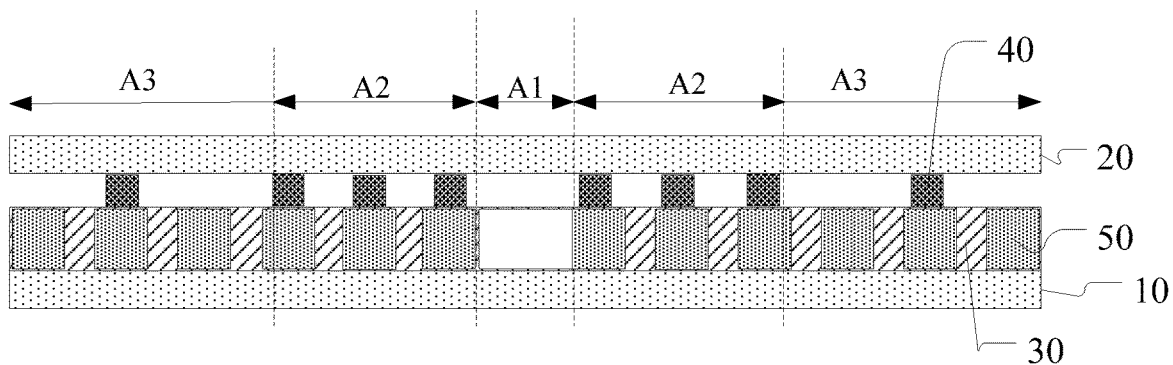
FIG. 12 illustrates a schematic diagram of film layers of another exemplary display panel consistent with disclosed embodiments of the present disclosure.

FIG. 12 illustrates a schematic diagram of film layers of another display panel consistent with disclosed embodiments of the present disclosure. In one embodiment, referring to FIG. 12, the display material layer 30 may include an organic light-emitting display material. The first substrate 10 may be an array substrate, and a pixel definition layer 50 may be disposed on the first substrate 10. The pixel definition layer 50 may have an opening region, and the organic light-emitting display material may be evaporated into the opening region. The organic light-emitting display material may not be disposed in the first region A1. In one embodiment, the organic light-emitting display material may not be evaporated into the opening region of the pixel definition layer 50 at a location corresponding to the first region A1. In another embodiment, the opening region may not be formed in the pixel definition layer 50 at a location corresponding to the first region A1, and the support pillar 40 may be disposed in any suitable location of the pixel definition layer 50 at a location corresponding to the first region A1.

The present disclosure further provides a display device. The display device may include any one of the display panels in the disclosed embodiments. The display device may have the same or similar technical characteristics and corresponding technical effects as the display panel, which is not described herein.

Figure 13:
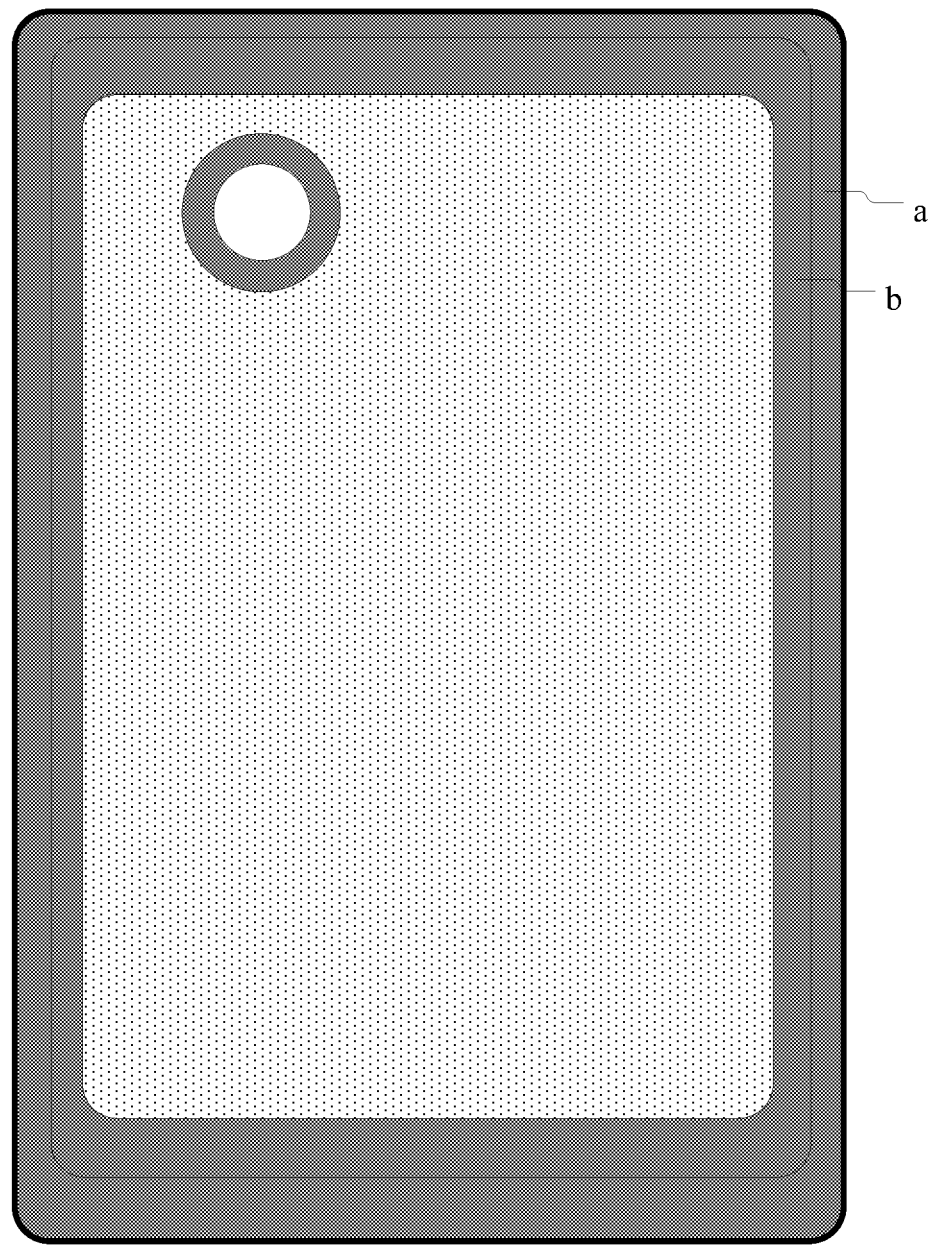
FIG. 13 illustrates a schematic diagram of an exemplary display device consistent with disclosed embodiments of the present disclosure.

FIG. 13 illustrates a schematic diagram of a display device consistent with disclosed embodiments of the present disclosure. In one embodiment, referring to FIG. 13, the display device may include a case 'a' and a display panel 'b' surrounded by the case 'a'. The display panel 'b' may be any one of the display panels in the disclosed embodiments.

In the disclosed display panel and display device, the display panel may include the first region containing no support pillar, such that the first region may act as a special functional region, e.g., a high light transmission region. Compared to the conventional display panel, for the regions disposed with the support pillars, the area density of the support pillars in the disclosed display panel may not be uniform. The support pillars may have an area density in the region disposed around the first region, i.e., the second region disposed surrounding the first region, larger than an area density in the region outside of the second region, i.e., the third region disposed surrounding the second region. Therefore, the insufficient panel pressure in the region around the first region due to the absence of the support pillars in the first region, and easy occurrence of water ripple issue may be resolved, and the display effect of the display panel may be improved.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments illustrated herein but is to be accorded the widest scope consistent with the principles and novel features disclosed herein.

What is claimed is:

1. A display panel, comprising:
   a first substrate and a second substrate, that are oppositely disposed;
   a display material layer and support pillars, that are disposed between the first substrate and the second substrate; and
   a first region, a second region disposed surrounding the first region, and a third region disposed surrounding the second region, wherein:
   the first region does not contain any support pillar or display pixels,
   the support pillars are disposed in the second and third regions, and have an area density in the second region larger than an area density in the third region, and
   an overall area density of the support pillars in the first region and the second region is consistent with the area density in the third region, such that an overall area density of the display panel is uniform in order to have a same withstand pressure ability.

2. The display panel according to claim 1, wherein:
   the second region includes a first sub-region and a second sub-region, wherein the first sub-region is disposed adjacent to the first region, and the second sub-region is disposed between the first sub-region and the third region; and
   the support pillars have an area density in the first sub-region larger than an area density in the second sub-region.

3. The display panel according to claim 1, wherein:
   in a unit area, a quantity of the support pillars in the second region is larger than a quantity of the support pillars in the third region.

4. The display panel according to claim 3, wherein:
   the support pillars in the second region and the third region has a same shape and a same size.

5. The display panel according to claim 1, wherein:
   the support pillars include a plurality of first support pillars and a plurality of second support pillars, wherein an area of an orthographic projection of a first support pillar of the plurality of first support pillars on the first substrate is larger than an area of an orthographic projection of a second support pillar of the plurality of second support pillars on the first substrate; and
   the second region includes the plurality of first support pillars, and the third region includes the plurality of second support pillars.

6. The display panel according to claim 5, wherein:
   in a unit area, a quantity of the plurality of first support pillars in the second region equals to a quantity of the plurality of second support pillars in the third region.

7. The display panel according to claim 1, wherein:
   the area density of the support pillars in the second region is obtained by a calculation according to an area of the first region, an area of the second region, and the area density of the support pillars in the third region.

8. The display panel according to claim 7, wherein:
   the area density of the support pillars in the second region is calculated using a formula:

$$d_B = (S_B + S_C) * d_A / S_B,$$

wherein $d_B$ is the area density of the support pillars in the second region, $d_A$ is the area density of the support pillars in the third region, $S_B$ is the area of the second region, and $S_C$ is the area of the first region.

9. The display panel according to claim 8, further including:
   a display region having the display pixels, a frame region covered by a black matrix, and a light transmission region uncovered by the display pixels and the black matrix, wherein:
   the first region is the light transmission region,
   the frame region includes a first frame region disposed close to an outer edge of the display panel and a second frame region disposed surrounding the light transmission region, and
   the second region includes the second frame region.

10. The display panel according to claim 9, wherein:
    the second region is the second frame region, and
    the third region is the display region.

11. The display panel according to claim 9, wherein:
    the display region includes a first display region disposed close to the second frame region and a second display region disposed between the first display region and the first frame region, wherein:
    the third region is the second display region, and the second region includes the second frame region and the first display region, and
    a sum of the area of the first region and the area of the second region is larger than or equal to a predetermined area threshold.

12. The display panel according to claim 11, wherein:
    the predetermined area threshold is 100 mm$^2$.

13. The display panel according to claim 9, wherein:
    the first region has one of a circular shape and an elliptical shape.

14. The display panel according to claim 1, wherein:
    an orthographic projection of the support pillar on the first substrate has a shape including a circular shape, an elliptical shape, a quadrangular shape, an elongated shape, or a combination thereof.

15. The display panel according to claim 1, wherein:
the display material layer includes a liquid crystal material, and
the second substrate includes a color resist layer, wherein the color resist layer is not disposed in the first region.

16. The display panel according to claim 1, wherein:
the display material layer includes an organic light-emitting display material, and
the organic light-emitting display material is not disposed in the first region.

17. A display device, comprising:
a display panel, wherein the display panel includes:
a first substrate and a second substrate, that are oppositely disposed;
a display material layer and support pillars, that are disposed between the first substrate and the second substrate; and
a first region, a second region disposed surrounding the first region, and a third region disposed surrounding the second region, wherein:
the first region does not contain any support pillar or display pixels,
the support pillars are disposed in the second and third regions, and have an area density in the second region larger than an area density in the third region, and
an overall area density of the support pillars in the first region and the second region is consistent with the area density in the third region, such that an overall area density of the display panel is uniform in order to have a same withstand pressure ability.

18. The display device according to claim 17, wherein:
in a unit area, a quantity of the support pillars in the second region is larger than a quantity of the support pillars in the third region.

19. The display device according to claim 18, wherein:
the support pillars in the second region and the third region has a same shape and a same size.

20. The display device according to claim 17, wherein:
the area density of the support pillars in the second region is obtained by a calculation according to an area of the first region, an area of the second region, and the area density of the support pillars in the third region.

* * * * *